United States Patent

Panis

[11] Patent Number: 5,973,754
[45] Date of Patent: *Oct. 26, 1999

[54] METHOD FOR COMPUTER-SUPPORTED MOTION ESTIMATION FOR PICTURE ELEMENTS OF CHRONOLOGICALLY FOLLOWING IMAGES OF A VIDEO SEQUENCE

[75] Inventor: Stathis Panis, Munich, Germany

[73] Assignee: Siemens Aktiengesellschaft, Munich, Germany

[*] Notice: This patent issued on a continued prosecution application filed under 37 CFR 1.53(d), and is subject to the twenty year patent term provisions of 35 U.S.C. 154(a)(2).

[21] Appl. No.: 08/768,180

[22] Filed: Dec. 18, 1996

[30] Foreign Application Priority Data

Dec. 22, 1995 [DE] Germany .......................... 195 48 452

[51] Int. Cl.$^6$ .......................... H04N 7/12; H04N 11/02; H04N 11/04
[52] U.S. Cl. .......................... 348/699; 348/412; 348/415
[58] Field of Search .......................... 348/699, 416, 348/415, 413, 412, 407, 420, 4; 382/294; H04N 7/12, 11/02, 11/04

[56] References Cited

U.S. PATENT DOCUMENTS

| | | | |
|---|---|---|---|
| 4,897,720 | 1/1990 | Wu et al. | 358/136 |
| 4,922,341 | 5/1990 | Strobach | 358/136 |
| 5,081,531 | 1/1992 | Parker | 358/105 |
| 5,357,287 | 10/1994 | Koo et al. | 348/699 |
| 5,398,068 | 3/1995 | Liu et al. | 348/699 |
| 5,535,288 | 7/1996 | Chen et al. | 348/407 |
| 5,600,731 | 2/1997 | Sezan et al. | 348/620 |
| 5,611,000 | 3/1997 | Szeliske et al. | 382/294 |

OTHER PUBLICATIONS

"The 'Orthologonal Algorithm' for Optical Flow Detection Using Dynamic Programming," Quénot, Multidimensional Signal Processing, San Francisco, Mar. 23–26 (1992), vol. 3, No. CONF. 17, pp. 249–252.
"Motion Estimation of Skeletonized Angiographic Images Using Elastic Registration," Tom et al., IEEE Trans. on Med. Imaging, vol. 13, No. 3, Sep. 1994, pp. 450–460.
"Occlusions and Binocular Stereo," Geiger et al., Int. J. of Comp. Vision, vol. 14 (1995), pp. 211–226.
"Stereo Without Regularization," Cox et al., NEC Research Institute, Princeton, New Jersey, (1992), pp. 1–31.
"Motion Estimation Techniques for Digital TV: A Review and a New Contribution," /Dufaux et al., Proc. of the IEEE, vol. 83, No. 6, Jun. 1995, pp. 858–876.
"Zuverlässigkeit und Effizienz von Verfahren zur Verschiebungsvektorschätzung," Mester et al., Mustererkennung 1995, 17th DAGM Symposium, Bielefeld, Germany, Sep. 13–15, 1995, pp. 285–294.

*Primary Examiner*—Howard Britton
*Assistant Examiner*—Nhon T. Diep
*Attorney, Agent, or Firm*—Hill & Simpson

[57] ABSTRACT

In a method for computer-supported motion estimation for picture elements of chronologically successive images of a video sequence, a motion estimation is implemented with using a known dynamic programming (DP) method. A further dimension is added to the optimization space of the DP algorithm. As a result, the motion of objects is recognized in all directions and an incorrect classification of picture elements as an occlusion, which could not be prevented in known methods, is thus avoided.

7 Claims, 4 Drawing Sheets

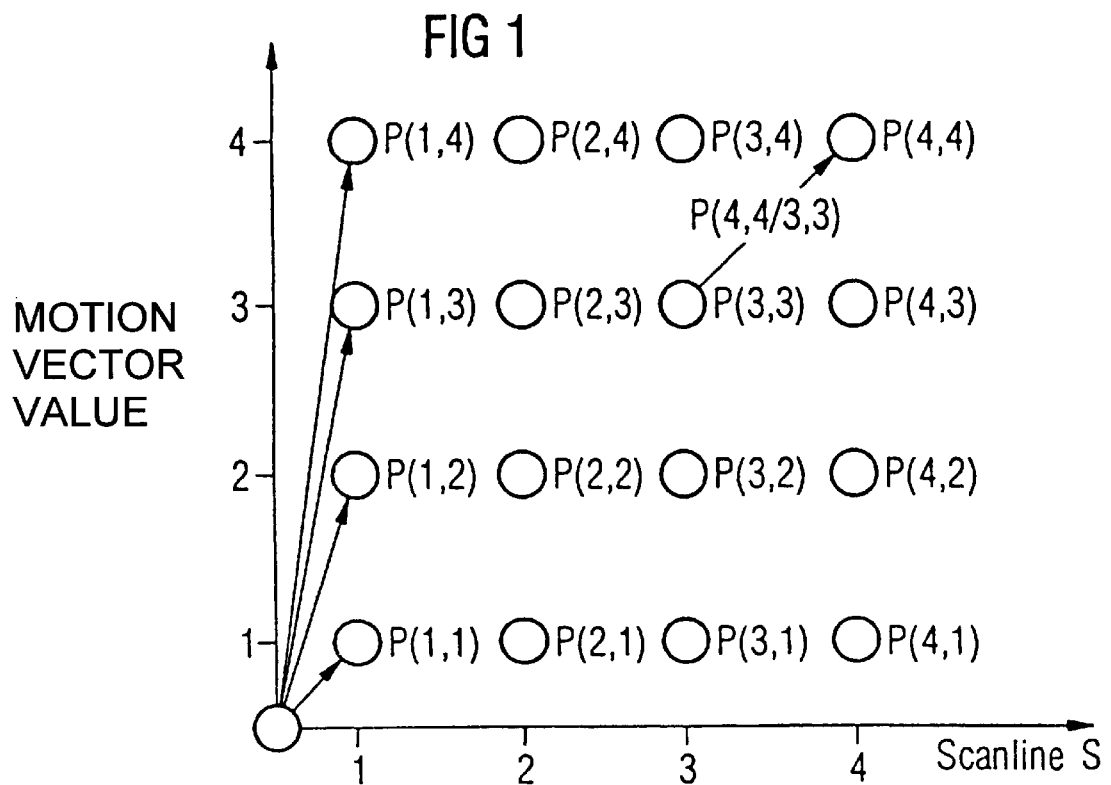
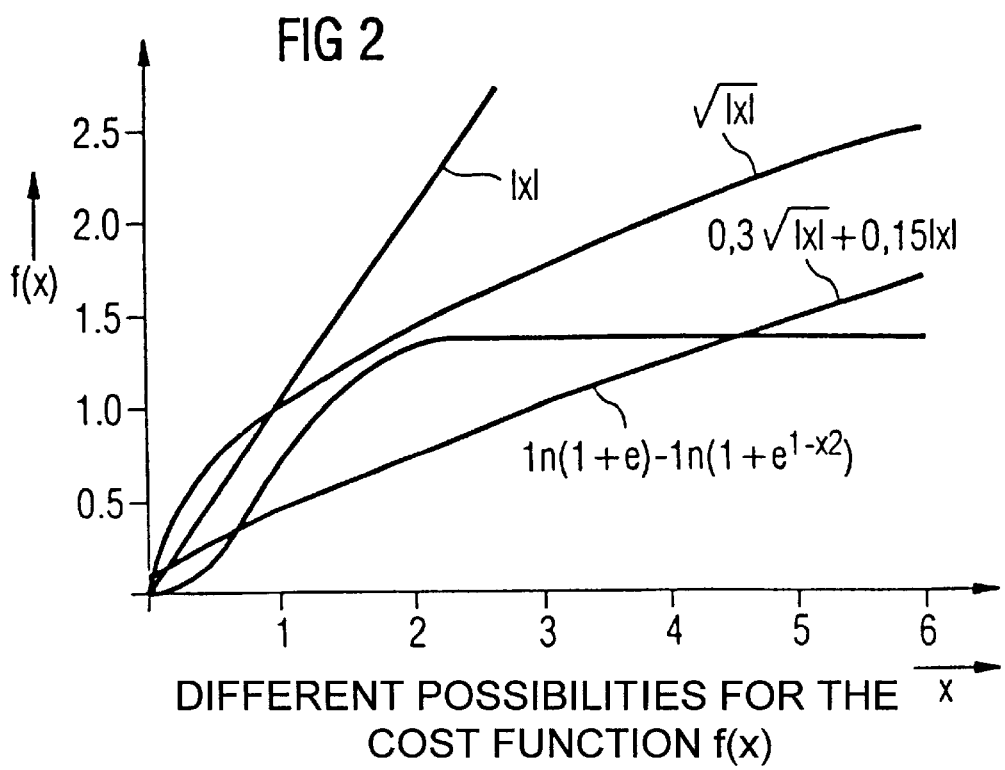

METHOD FOR COMPUTER-SUPPORTED MOTION ESTIMATION FOR PICTURE ELEMENTS OF CHRONOLOGICALLY FOLLOWING IMAGES OF A VIDEO SEQUENCE

BACKGROUND OF THE INVENTION

1. Field of the Invention

The present invention is directed to a method for computer-supported motion estimation for picture elements of chronologically following images of a video sequence.

2. Description of the Prior Art

In the field of block-based image coding methods, and object based image coding methods as well, a qualitatively high-grade motion estimate for the blocks or, respectively, objects of the individual images of a video sequence is important in order to achieve a high quality of the reconstructed images at the receiver of the video data stream with an optimally high saving in required transmission capacity.

Instead of having to code the luminance information and/or chrominance information of the individual picture elements (pixels) of the images of a video sequence, motion estimation makes it possible to encode only the form or shape of specific blocks, or only the form or shape of specific objects, as well as further information with respect to the blocks or objects between two successive images, the encoded blocks or objects and information being transmitted to the receiver.

For example, the further information can identify the shift of these blocks or objects between two successive images.

A considerable savings in the required transmission capacity is achieved with this block-based or object-based coding.

Fundamentals about motion estimation in block-based image coding methods may be found, for example, in the following documents: R. Mester and M. Hötter, Zuverlässigkeit und Effizienz von Verfahren zur Verschiebungsvektor-schätzung, Mustererkennung, 1995, Informatik Aktuell, Springer Verlag, pp.285–294; Liu et al., Method and Apparatus for determining motion vectors for image sequences, U.S. Pat. No. 5,398,068, 1995; F. Dufaux and F. Mschehni, Motion Techniques for digital TV: A Review and a New Contribution, Proceedings of the IEEE, Vol. 83, No. 6, pp.858 through 876, June 1995.

A dynamic programming method is known from H. Sakoe et al., Dynamic Programming Algorithm Optimization for Spoken Word Recognition, IEEE Transactions, Vol. ASSP-26, No.1, pp.43 through 49, 1978.

The use of the dynamic programming method (Dynamic Programming Algorithm, DP method) is also known in image processing and particularly in conjunction with so-called stereo correspondence (D. Geiger et al., Occlusions and Binocular Stereo, Intern. Journal of Computer Vision, No.14, Kluwer Academic Publishers, Boston, pp.211 through 226, 1995).

One disadvantage in this method is that the cost function employed in the DP method is fashioned such that the motion vectors allocated to the picture elements are intensified in such a way that the motion vectors have no large differences within a uniform surface or area, i.e. within an object to be classified, so that no large discontinuities occur between the motion vectors (monotonicity constraint). Although a qualitatively good motion estimation is thereby achieved for the picture elements within the object, this method is inadequate especially for picture elements at the edges of objects, since these picture elements are not classified as object edge elements or points in this method but—erroneously—as occlusions.

Another method that employs the DP algorithm for motion estimation in the framework of stereo correspondence is known from I. Cox et al., Stereo Without Regularization, NEC Research Institute, Princeton, N.J. 08540, pp. 1–31,1992.

The two methods described above also have the disadvantage that the DP method is only implemented in a two-dimensional optimization space. This means that only the motion of objects in one direction is reliably recognized, for example in the direction of the investigated scan line. When, however, an object moves rapidly in another direction, then, as set forth below, it can occur that the object is no longer "found" by the DP method, and thus faulty motion vectors are allocated to the individual picture elements by this method.

SUMMARY OF THE INVENTION

An object of the present invention is to provide a method for motion estimation that classifies correctly even given large shifts of objects between two successive images in different directions, even in the directions which differ from the scan line direction, and thus correct motion vectors are allocated to the individual picture elements of the images of the video sequence.

The above object is achieved in accordance with the principles of the present invention in a method for computer-supported motion estimation for picture elements of chronologically successive images of a video sequence, wherein a cost function is determined for each picture element of an image to be encoded, the cost function indicating the coincidence of an area surrounding the picture element with an area of the same shape in a chronologically preceding image that is shifted compared to the area which surrounds the picture element of the image to be encoded, wherein a dynamic programming is conducted dependent on the cost function for each picture element employing a three-dimensionally optimized search area resulting in a determination of first and second motion vector values for the picture element respective in first and second directions, and wherein the first and second motion vector values are then allocated to the picture element.

As noted above, a three-dimensional optimization area, also called the search area, is employed for the DP algorithm.

The three dimensions are:
- the scan line along which the motion estimation is implemented,
- values for motion vectors in a first direction, and
- values for motion vectors of a second direction that is unequal to the first direction.

This expansion of the optimization space for the DP algorithm also makes it possible to still recognize objects that are greatly shifted in a second direction differing from the first direction between two chronologically successive images and to thus to be able to correctly implement the motion estimation for the individual pixels.

Misclassifications of areas as occlusions, as are inescapable in the known methods, are thus avoided.

The regularization, however, is not implemented along the scan line as a whole; rather, the scan line is divided into individual segments dependent on whether an edge of an object is recognized. When a picture element of the scan line is classified as an edge element with an increased value of the luminance gradient of the respective picture element resulting therefrom, the influence of the enhanced luminance gradient of the picture element on the part of the cost function of the DP algorithm that serves for regulation is "damped". As a result, the scan line is divided into segments that correspond to the individual objects that are delimited from one another by edges.

In an embodiment of the method is a region having a rectangular or quadratic shape is employed for the so-called matching of a picture element of two chronologically successive images. The luminance values of the individual picture elements that are located within this region are added, normalized and compared to one another in this region surrounding the particular picture element.

DESCRIPTION OF THE DRAWINGS

FIG. 1 is a diagram in which the known DP method is schematically illustrated.

FIG. 2 shows a number of functions that can be employed as additional summands for the cost functions described below.

DESCRIPTION OF THE PREFERRED EMBODIMENTS

Figure 3:
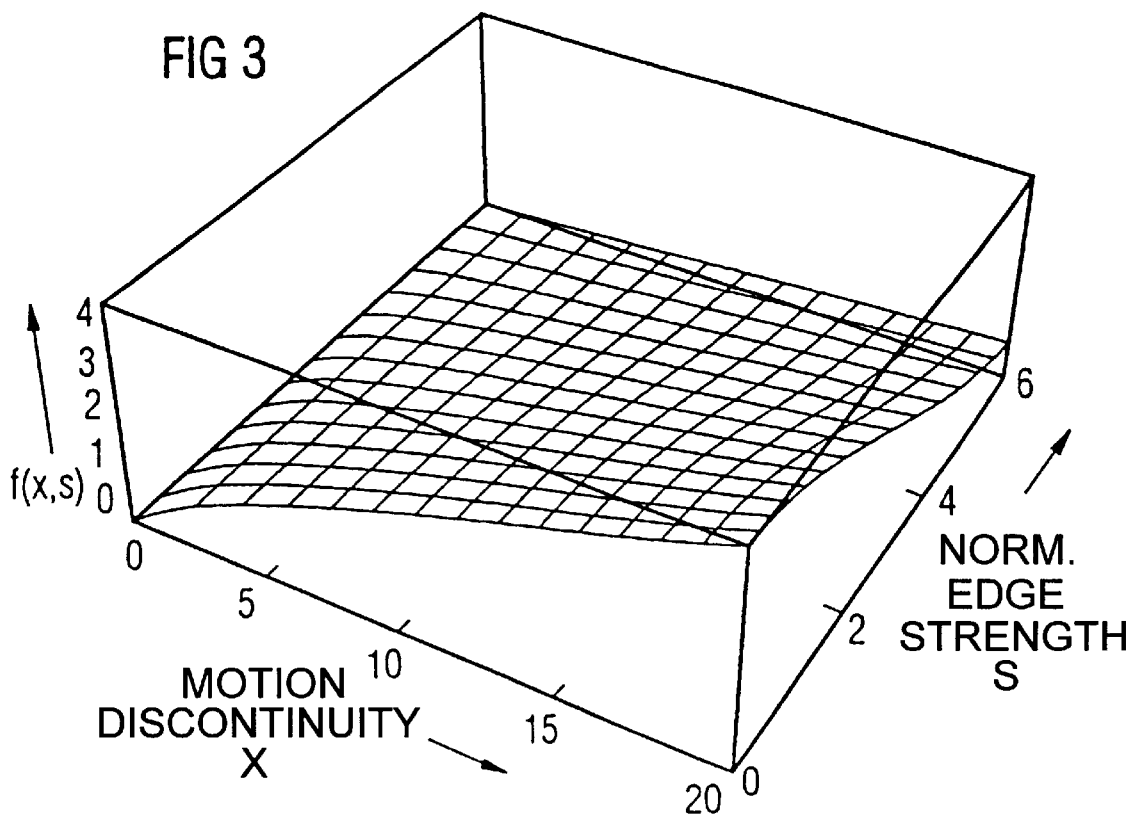
FIG. 3 is an illustration of a function that is especially suitable as an additional summand in the cost function.

The invention will be explained by first describing the basics of known dynamic programming techniques, followed by an explanation of the inventive dynamic programming method with three-dimensional optimization.

Dynamic Programming

The underlying method of dynamic programming is explained in H. Sakoe et al., Dynamic Programming Optimisation for Spoken Word Recognition, IEEE Transactions, Vol. ASSP-26, No.1, pp.43 through 49, 1978.

Transferred to image processing and specifically motion estimation, the goal of the method of dynamic programming is to determine the greatest possible coincidence of a scan line from a first image with a region of a second image in the video sequence that chronologically follows the first image, and thereby implement a motion estimate for the picture elements located on the respective scan line.

The method of dynamic programming is an optimization method that requires a priori statistical information as well as certain determination rules for the determination of an optimum solution.

A probability P(n−1, d) indicates the probability that a first picture element n−1 on a scan line has a motion vector value d.

A conditional probability P(n, d'|n−1, d) indicates the probability that a second picture element n has a further motion vector value d' under the condition that the first picture element n−1 has the motion vector value d.

The further motion vector value d' can be equal or unequal to the motion vector value d.

It should be noted that the probabilities described above are valid for all picture elements and for all motion vector values allocated to the picture elements. The first picture element n−1 and the second picture element n are two neighboring picture elements that are located on the same scan line.

When these conditional probabilities are known for each picture element in a path along which the dynamic programming method is implemented, this can be formulated as an optimization problem that can be solved by the dynamic programming method.

The determination of the conditional probabilities for the individual picture elements and their allocated motion vector values is explained below.

In FIG. 1, as a small basic example over a scan line S that has N picture elements, (the index n for designating the individual picture elements being in the interval [0 . . . N]), possible motion vector values d that can be allocated to the respective picture element are entered for every picture element that is located on the scan line S.

For simplification, N=4 is selected in FIG. 1, and only four possible motion vector values for the four individual picture elements of the scan line S are also shown.

It should be noted that this is only an extremely simple example that is merely intended to facilitate an understanding of the method of dynamic programming and that in no way limits the universal validity of the method.

The probability that a particular picture element n has the corresponding motion vector value d is also entered for every picture element in FIG. 1. For example, the probability that the picture element n=2 has the motion vector value d=3 is referenced P(2, 3).

The conditional probability for the following picture element is also determined for each picture element. This probability is shown in FIG. 1 with, for example, P(4, 4|3, 3), this indicating the probability of the picture element n=4 having the further motion vector value d'=4 under the condition that the picture element n=3 (−1) has the motion vector value d=3.

The determination of the conditional probability for the individual picture elements and the allocated motion vectors is explained in further detail below.

An evaluation C is determined from the individual probabilities and the individual conditional probabilities, this representing a criterion for the respective occurrence probability of the entire path, i.e. of the combination of the individual allocation of the motion vectors to the respective picture elements.

The maximum of the evaluation C then yields the greatest coincidence of the respective picture elements of the scan line between the two chronologically successive images.

The evaluation C ensues in the following way:

$$C = \max\left(\sum_{n=0}^{N} P(n, d' | n-1, d) \cdot P(n, d')\right) \quad (1)$$

It is only necessary in the implementation of the dynamic programming method that a path must be taken into consideration from a starting point to a sought end point.

Given the example shown in FIG. 1, this means that the remaining fifteen possible paths, given sixteen possible paths, need not be taken into consideration. The maximum value of the evaluation C for a path of i vectors that end in the picture element j is referenced D(i, j).

D(i, j) is recursively determined according to the following rule (specifically for the example shown in FIG. 1):

$$D(i,j) = \max \; [D(i-1,k) + P(j|k) \cdot P(j,i)] \quad (2)$$

$$1 \leq k \leq 4$$

The respective motion vector value that is allocated to the picture element j is referenced with an index k.

For a path that, for example, ends in the picture element n=3, this means $$D(4,3) = \max \; [D(3,k) + P(3|k) \cdot P(3,4)] \quad (3)$$

$$1 \leq k \leq 4$$

The recursion equation (2) is now implemented for a path length of n vectors, whereby the method is spatially implemented for the picture elements of the respective image from left to right under the assumption that all scan lines begins at a "$0^{th}$" picture element n=0.

In order to determine the globally best pattern, i.e. in order to determine the best path, this path must also be backtracked. This requires that the optimum precursor of a picture element and of the motion vector allocated to this picture element must respectively be capable of being relocated for every vector in an overall path. This is achieved by storing and marking the optimum precursor. What is referred to as backtracking thus is achieved for determining the optimum overall allocation of the motion vector values to the picture elements of the scan line S.

The size of the value range of the motion vector values d is of critical significance for the speed with which the dynamic programming method can be implemented. This search area is usually limited by specific assumptions. An example of such limitations is the monotonicity constraint that is utilized to insure that the motion vectors of picture elements within an object form a monotonous function. This is due to the assumption that all picture elements of an object have similar motion vector values since, of course, the position of the object also changes uniformly.

DP Method with Three-Dimensional Optimization

The problem of image processing given motion estimation by dynamic programming is that an object can be shifted in any arbitrary direction between two successive images.

Figure 4A:
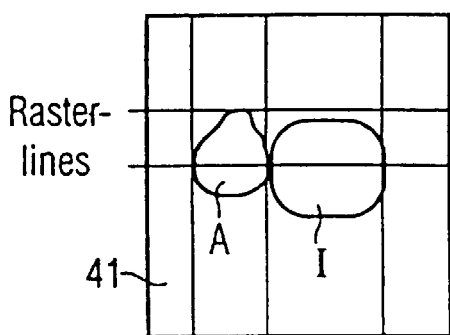
FIGS. 4a and 4b schematically illustrate two chronologically successive images with two objects A and B, with an object A shifted in a second direction (FIG. 4b), illustrating the problem on which the invention is based.
Figure 4B:
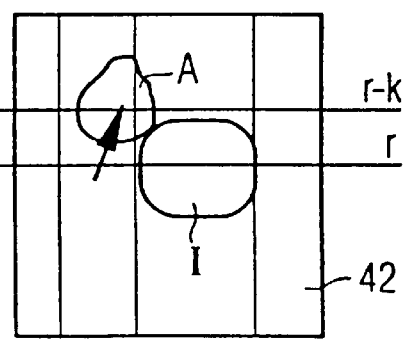

The position of an object thus possibly may also change very rapidly between two images. This problem is shown in FIGS. 4a and 4b in which a first object A is shifted horizontally as well as vertically in a second image 42 with reference to a first image 41.

A second object B, by contrast, is not vertically shifted.

Figure 5A:
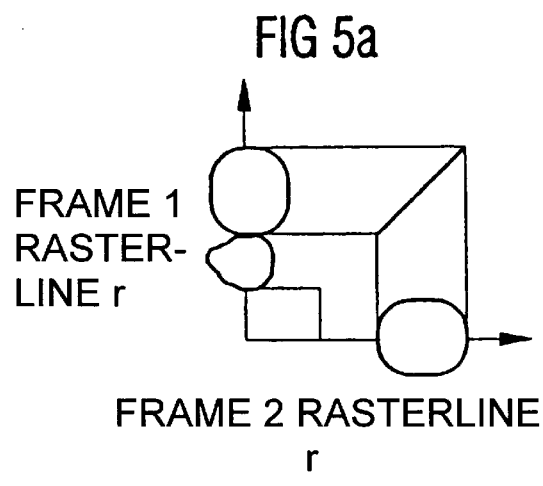
FIGS. 5a and 5b schematically illustrate the result of the DP method applied to the objects A and B shown in FIGS. 4a and 4b, first with a known method (FIG. 5a) wherein a occlusion is determined, and a result of the inventive DP method with an additional "search direction" in the optimization space of the DP method (FIG. 5b), the incorrect classification being thereby avoided and the object A being classified in a correct way.

When a raster line r is then employed as the scan line in the dynamic programming method in order to obtain a coincidence of the raster line r of the first image 41 with a region of a second image 42, a coincidence gap is determined on the basis of the vertical shift of the first object A in the application of the known method, as shown in FIG. 5a. The respective points of coincidence, i.e. the correctly classified picture elements, are described in FIG. 5a with the motion vector values allocated to them.

In the known method, no coincidence between the luminance values of the picture elements of the first image 41 and the luminance values of the picture elements of the second image 42 can be determined. For this reason, the area of these picture elements is incorrectly classified as an occlusion.

This vertical motion of the first object A is inventively compensated by the following procedure. The raster line r is "divided" into a number of segments of other raster lines.

A further raster line r-k is shown in FIG. 4b as a simple example.

Figure 5B:
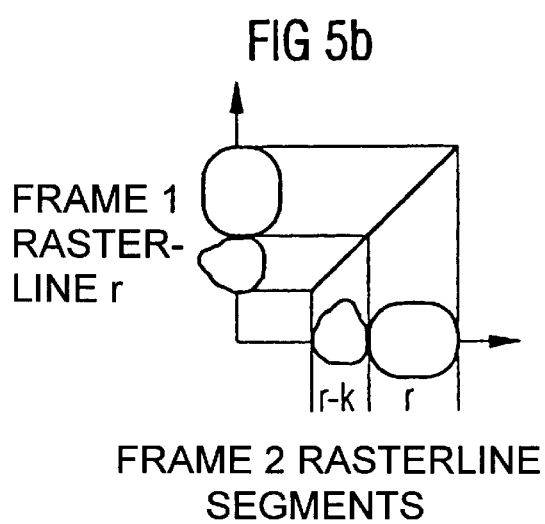

The improved result that occurs by the use of a number of segments of several raster lines is shown in FIG. 5b. The points of coincidence in FIG. 5b are in turn respectively described by the line P.

The raster line r of the first image 41 is shown in each of FIGS. 5a and 5b. This, first, is contrasted with the raster line r of the second image 42 (FIG. 5a) or the further raster line r-k of the second image according to the inventive method (FIG. 5b).

The vertical shift of the further raster line r-k compared to the raster line r is thereby referenced with k.

The number of further raster lines that are each vertically shifted compared to the raster line r is arbitrary and application-dependent.

The optimization of the evaluation C now ensues in a three-dimensional optimization space using the following rule:

$$C = \max\left(\sum_{n=0}^{N} P(n, d'_1, d'_2 | n-1, d_1, d_2) \cdot P(n, d'_1, d'_2)\right) \quad (4)$$

$P(n, d_1', d_2'|n-1, d_1, d_2)$ thereby indicates the probability that a picture element n on the scan line S has the motion vector $d_1'$, $d_2'$) under the condition that the neighboring picture element n-1 has the motion vector $(d_1, d_2)$. $P(n, d_1', d_2')$ indicates the probability that the picture element n has the motion vector $(d_1', d_2')$.

The procedure described in the preceding example is inventively realized by expanding the optimization space employed for the dynamic programming method by another dimension.

This further dimension of the optimization space is likewise taken into consideration in the determination of the respective cost function $T_n(d_1, d_2)$ for the individual picture elements n. This means that two values are assigned to a picture element n along a raster line, a first motion vector value $d_1$ for a first direction and a second motion vector value $d_2$ for a second direction.

The regularization, however, is not implemented along the scan line as a whole; rather, the scan line is divided into individual segments dependent on whether an edge of object is detected. When a picture element of the scan line is classified as an edge element with an increased value of the luminance gradient of the respective picture element resulting therefrom, the influence of the boosted luminance gradient of the picture element on the part of the cost function of the DP algorithm that serves for regularization is "damped". As a result, the scan line is divided into segments that correspond to the individual objects that are delimited from one another by edges.

This achieves the improvement that the regularization (monotonicity constraint) occurs only with each object, and classification errors at object edges are thus avoided.

Cost Functions

When the individual probabilities and the individual conditional probabilities for the respective picture elements $s_p$ and the motion vectors ($d_1$, $d_2$) possibly allocated to the picture elements $s_p$ are not yet known, then they can be calculated, for example, in the following way.

The cost function $T_n(d_1, d_2)$, which corresponds in principle to the conditional probability that was described above, is determined according to the following rule for each picture element $s_p$ for every possible shift, i.e. for all possible first motion vector values $d_1$ and all possible second motion vector values $d_2$:

$$T_n(d_1, d_2) = \frac{c}{N} \sum_{i=n-T}^{n+T} \sum_{j=m-\lambda}^{m+\lambda} \sqrt{(W_{F1}(i,j) - (W_{F2}(i+d_1, j+d_2))^2} \quad (5)$$

whereby n, m are coordinate values of individual picture elements $s_p$, $d_1$ is the assumed first motion vector value, $d_2$ is the assumed second motion vector value, so that ($d_1, d_2$) describes the assumed motion vector, c is a normalization constant, $W_{F1}(i,j)$ describes a luminance value of the image to be coded at the location (i,j), and $W_{F2}(i,j)$ describes a luminance value of the chronologically preceding images at the location (i,j).

The picture element size of the region in the first direction is 2T+1. The picture element size of the region in the second direction is 2λ+1. N is the number of picture elements located in the region, and N=(2T+2λ−1)·3.

This procedure for determining the coincidence of a picture element $s_p$ of the first image with a picture element of the second image is called block matching.

The region that is used for calculating the cost function for the respective picture element can basically be shaped in an arbitrary way.

It is advantageous, however, when the region has a quadratic shape or a shape as shown in FIG. 6.

Figure 6A:
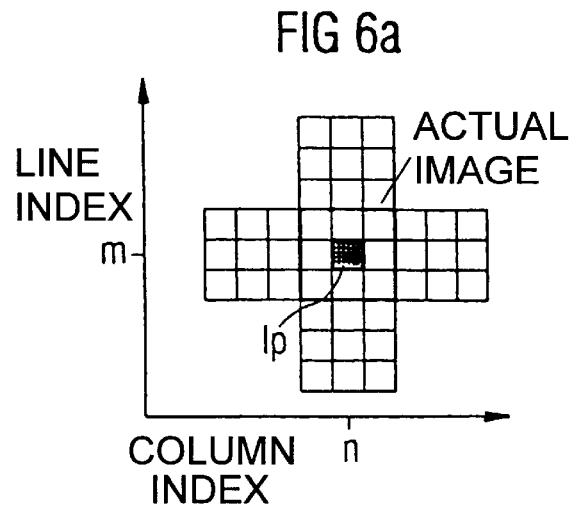
FIGS. 6a and 6b schematically illustrate a region that surrounds the pixel under investigation in a first image (FIG. 6a) and in an image chronologically following the first image defined by a motion vector (d1, d2) that describes the assumed shifts of the picture element from FIG. 6a with respect to the first direction and the second direction (FIG. 6b).
Figure 6B:
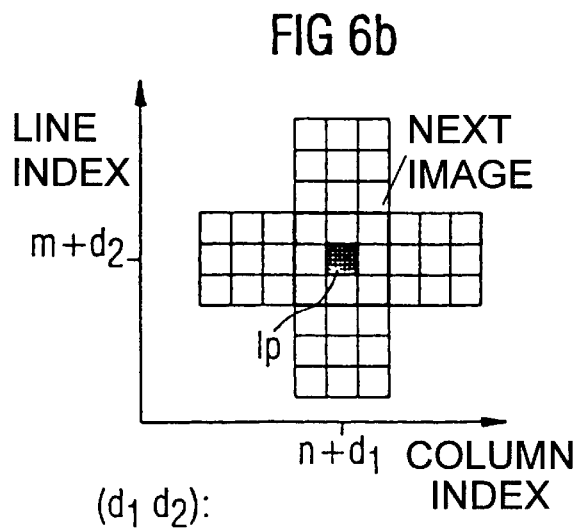

Given this region shown in FIGS. 6a and 6b, the advantage of the shape of the region can be seen in that, due to the shape, the coincidence results in the proximity of edges has an improved reliability over many other shapes of the region to be employed.

This shape of the region is advantageously selected in order to achieve better results in the motion estimation in two pronounced directions that reside approximately perpendicular to one another. For this reason, the region has the shape of a cross in this specific exemplary embodiment.

This, however, does not limit the general use of arbitrary shapes of the region in any way.

The luminance difference for every possible shift is formed in the three-dimensional search area, this difference being also normalized by dividing the result by the number of picture elements situated in the area.

This fundamentally corresponds to the probability that a picture element $s_p$ of the first image respectively corresponds to the picture element in of the second image shifted by the corresponding first motion vector value and the corresponding second motion vector value (see FIGS. 6a and 6b).

If the cost function for the respective picture element has the value zero, this means that there is complete coincidence between the luminance values of the two regions of the first image and the second image. If the cost function has the value one, this means a complete non-coincidence of the luminance values between the region of the first image and the region of the second image shifted by the corresponding motion vector values.

The sole difference of the identified cost function $T_n(d_1, d_2)$ can be seen to be that an increasing probability occurs as the cost function assumes lower values. This, however, need not be separately taken into consideration in the method, but only to the extent that the optimization in the DP method happens to be implemented according to a minimal cost function.

FIG. 6a shows a picture element $s_p$ with the picture element coordinates n, m and the area within which the cost function $T_n(d_1, d_2)$ is formed for the picture element $s_p$.

FIG. 6b shows the area shifted by the motion vector ($d_1$, $d_2$). This means that the coincidence of the picture element $s_p$ of the first image with a further picture element $s_p'$ of the second image that was shifted in the second image compared to the first image and the motion vector ($d_1, d_2$) is investigated.

In an embodiment of the method an additional summand $f(x_1)$ and/or $f(x_2)$ is attaached to the cost function $T_n(d_1, d_2)$. This additional summand is determined in the following way:

$$f(x_1) = \mu\sqrt{|x_1|} + \varepsilon|x_1|, \qquad x_1 \geq 0, \quad (6)$$

and/or $$f(x_2) = \mu\sqrt{|x_2|} + \varepsilon|x_2|, \qquad x_2 \geq 0, \quad (6)$$

whereby $x_1, x_2$ each represent a differential quantity of the motion vector values respectively for the first direction $d_1$ and the second direction $d_2$ of two neighboring picture elements along of the scan line S, $\mu\varepsilon$ are two empirically determined constants.

The two empirically determined constants $\mu$ and $\varepsilon$ preferably have the values $\mu$=0.3 and $\varepsilon$=0.15.

The use of these further summands causes the motion vectors of picture elements within an object to form a monotonous function (monotonicity constraint).

Further functions that have the same properties as the additional summand are shown in FIG. 2 and are also known from D. Geiger et al., Occlusions and Binocular Stereo, Intern. Journal of Computer Vision, No.14, Kluwer Academic Publishers, Boston, pp.211 through 226, 1995.

Other functions can likewise be introduced in the inventive method as an additional summand without limitations.

In a further modification of the method, an additional summand having the following form is attached to the cost function $T_n(d_1, d_2)$:

$$f(x_1, s) = \frac{(\mu \sqrt{|x_1|} + \varepsilon |x_1|)}{e^{\beta s^2}}, \qquad x_1 \geq 0, s \geq 0, \qquad (7)$$

and/or $$f(x_2, s) = \frac{(\mu \sqrt{|x_2|} + \varepsilon |x_2|)}{e^{\beta s^2}}, \qquad x_2 \geq 0, s \geq 0, \qquad (7)$$

whereby $x_1$, $x_2$ again each represent a differential quantity of the motion vector values respectively for the first direction $d_1$ and the second direction $d_2$ of two neighboring picture elements along the scan line S, $\mu$, $\varepsilon$ again are two empirically determined constants, $\beta$ is a gradient intensification constant, and s is a normalized luminance gradient for the respective picture element.

Due to the denominator $e^{\beta s^2}$ of this additional summand, the influence of the monotony function $\mu \sqrt{|x_1|+\varepsilon|x_1|}$ and/or $\mu \sqrt{|x_2|+\varepsilon|x_2|}$ on the cost function $T_n(d_1, d_2)$ is made dependent on the change in the luminance of the respective picture element, and this causes the influence of the monotony function on the cost function $T_n(d_1, d_2)$ to be large within objects, but only slight at the object edges.

The influence of the monotony function $\mu \sqrt{|x_1|+\varepsilon|x_1|}$ and/or $\mu \sqrt{|x_2|+\varepsilon|x_2|}$ on the cost function $T_n(d_1, d_2)$ is thus reduced at the object edges, so that the dynamic programming method primarily employs the first summand $NMC_n(d_1, d_2)$ of the cost function $T_n(d_1, d_2)$ as an optimization criterion in this region in this case.

Since the use of Equation (5) usually exhibits better results in the proximity of object edges than within an object, the dependability of the cost function $T_n(d_1, d_2)$ is enhanced at the object edges and, as a result, a correct classification for the respective picture element and of the motion vector $(d_1, d_2)$ allocated to this picture element is achieved without influence of the monotony function.

A typical problem in this field of application lies in the regions in which large changes of motion vectors appear between two successive picture elements along the raster line r due to rapid movement (large shift) of an object.

If the edges of the object were not taken into consideration and only Equation (6) were considered as the additional summand in the cost function, the overall costs for the respective picture element in the framework of the DP method would become extremely high for the assumed motion vector at the object edges and these high costs would cause a region with large movement to be interpreted as an occlusion.

Any desired type of gradient filter known to a person skilled in the art can be employed for determining the normalized luminance gradient for the respective picture element.

The use of the Sobel operator, however, shall be shown in this exemplary embodiment. The luminance gradient for a direction K can be determined by the following convolution relationship:

$$G_K(n,m) = F(n,m) \otimes H_K(n,m) \qquad (8)$$

wherein $H_K(n,m)$ indicates a 3×3 pulse response matrix that is employed for determining the respective luminance gradient in four directions. These four directions are the vertical direction V, the horizontal direction H, a direction L inclined 45° toward the left from the perpendicular, and a direction R inclined 45° toward the right from the perpendicular. The individual matrices of the pulse responses of the Sobel operator are set forth below.

Pulse response matrix $H_H$ for the horizontal direction H:

$$H_H = \frac{1}{4}\begin{bmatrix} 1 & 0 & -1 \\ 2 & 0 & -2 \\ 1 & 0 & -1 \end{bmatrix}.$$

Pulse response matrix $H_V$ for the vertical direction V:

$$H_V = \frac{1}{4}\begin{bmatrix} -1 & -2 & -1 \\ 0 & 0 & 0 \\ 1 & 2 & 1 \end{bmatrix}.$$

Pulse response matrix $H_L$ for the direction L inclined 45° toward the left from the perpendicular:

$$H_L = \frac{1}{4}\begin{bmatrix} -2 & -1 & 0 \\ -1 & 0 & 1 \\ 0 & 1 & 2 \end{bmatrix}.$$

Pulse response matrix $H_R$ for the direction R that is inclined 45° toward the right from the perpendicular:

$$H_R = \frac{1}{4}\begin{bmatrix} 0 & -1 & -2 \\ 1 & 0 & -1 \\ 2 & 2 & 0 \end{bmatrix}.$$

F(n,m) is the region of the image that is convoluted with the Sobel operator. A gradient $G_K(n,m)$ for the respective picture element (n,m) is determined for each direction K $\in$ [H, V, R, L].

The maximum value $G_{max}(n,m)$ of the four identified gradients is employed as the gradient of the edge for the respective picture element (n,m):

$$G_{max}(n,m) = \max(G_H(n,m), G_V(n,m), G_L(n,m), G_R(n,m)) \qquad (9)$$

This means that the normalized luminance gradient s is derived in the following way:

$$s = \frac{G_{max}(n, m)}{\omega} \qquad (10)$$

wherein $\omega$ indicates a normalization constant.

FIG. 3 shows the additional summand in the form of a two-dimensional function f(x,s). This function can be divided into two different areas: $0 \leq s \leq 1$ and $s \geq 1$. In the region $0 \leq s \leq 1$:

$$e^{\beta s^2} \approx 1 \Rightarrow f(x, s) = \mu \sqrt{|x|} + \varepsilon |x| \qquad x \geq 0 \qquad (11)$$

For 0<s<1, Equation (11) shows that the additional summand only "damps" large changes of motion vectors for that case wherein no object edge could be determined or wherein only an extremely slight luminance gradient s could be identified, and thus insures that the motion vectors that are allocated to picture elements within an object yield a monotonous function.

The second region for $s \geq 1$ describes the areas wherein a pronounced edge was identified. The influence of this function on the cost function is thus reduced in order to "allow" a discontinuity of the motion vectors of neighboring picture elements.

In the second region $s \geq 1$:

$$e^{\beta s^2} < 1 \Rightarrow f(x, s) = \frac{(\mu\sqrt{|x|} + \varepsilon|x|)}{e^{\beta s^2}} \qquad x \geq 0 \qquad (12)$$

An overall cost function $Tg_n(d_1, d_2)$ is now determined on the basis of the individual picture elements according to the following recursive rule:

$$Tg_n(d_1,d_2) = NMC_n(d_1,d_2) + f(x_1,s) + f(x_2,s) + Tg_{n-1}(d_{1_{best}}, d_{2_{best}}) n > 1 \quad (13a)$$

and $$Tg_n(d_1,d_2) = NMC_n(d_1,d_2) \text{ for } n=1 \qquad (13b)$$

The term $Tg_{n-1}(d_{1_{best}}, d_{2_{best}})$ is the best allocation of a motion vector $(d_{1_{best}}, d_{2_{best}})$ for a preceding picture element n−1.

This corresponds to the fundamental procedure with the above-described conditional probability in the framework of the DP method, with the difference that it is not the maximum evaluation C that is sought, which corresponds to a maximum occurrence probability, but instead a minimum of the overall cost function $T_n(d_1,d_2)$ is determined in this case in order to minimize the overall costs.

As a result, an optimum allocation of the motion vectors to the individual picture elements that are located on the respective scan line S is achieved.

Figure 7:
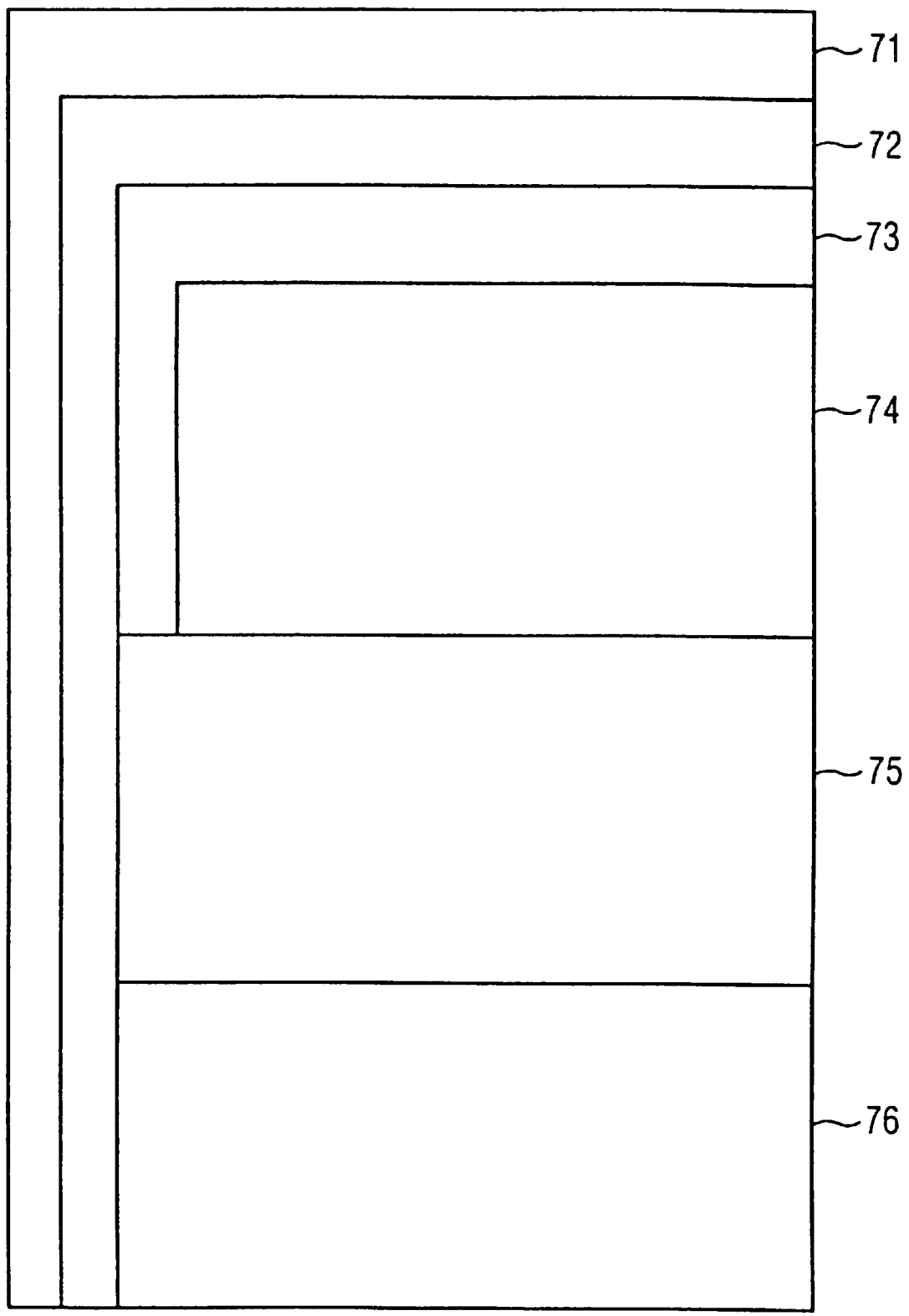
FIG. 7 is a flowchart in which individual method steps of the inventive method are shown.

FIG. 7 shows the method in the form of a flowchart.

In a first step, the following methods steps for each scan line S of the image 72 are iteratively implemented for each image of a video sequence 71.

The cost function $T_n(d_1,d_2)$ is determined in step 74 for each picture element that is located in step 73 on the scan line S, either with or without an additional summand, as described above.

A DP method is implemented in step 75 for the picture elements of a scan line S, whereby an overall path is determined with a three-dimensional optimization space on the basis of a minimum overall cost function $Tg_n(d_1,d_2)$, as was described above.

In a last step 76, the motion vector values calculated by the DP method are allocated to the picture elements of the scan line S.

After the motion estimate has been implemented, the picture elements also can be classified to objects and a motion vector can be allocated to the objects. This procedure is familiar to anyone skilled in the art.

Taking the individual objects and the motion vectors into consideration, the images are then channel-coded to form a video data stream and this video data stream is transmitted via a channel to a receiver, where the video data stream is in turn decoded and the image is reconstructed. These procedures are also well-known to a person skilled in the art.

The inventive method is a method of image processing and is necessarily implemented by at least one computer.

Although modifications and changes may be suggested by those skilled in the art, it is the intention of the inventor to embody within the patent warranted hereon all changes and modifications as reasonably and properly come within the scope of his contribution to the art.

I claim as my invention:

1. A method for computer-supported motion estimation for picture elements of chronologically successive images of a video sequence, comprising the steps of:

determining a cost function for each picture element of an image to be encoded, said cost function indicating coincidence of an area, having a shape, surrounding the picture element with an area of the same shape in a chronologically preceding image that is shifted compared to the area that surrounds the picture element of the image to be encoded;

conducting a dynamic programming dependent on the cost function for each picture element, employing three-dimensional search areas defined by at least a scan line along which the motion estimate is implemented, first motion vector values ($d_1$) for the picture element for a first direction, and second motion vector values ($d_2$) for the picture element for a second direction, with none of said scan line, said first direction and said second direction being parallel to each other; and allocating said first and second motion vector values determined from the dynamic programming to the picture element.

2. A method as claimed in claim 1, comprising employing a search area which extends over a plurality of picture elements in at least one of said first and second directions.

3. A method as claimed in claim 1, comprising employing a search having a quadratic shape.

4. A method as claimed in claim 1, comprising recursively forming the cost function according to the following rule:

$$T_n(d_1, d_2) = \frac{c}{N} \sum_{I=n-T}^{n+T} \sum_{j=m-\lambda}^{m+\lambda} \sqrt{(W_{F1}(i,j) - (W_{F2}(i+d_1, J+d_2))^2}$$

wherein n, m are coordinate values of individual picture elements $s_p$, $d_1$ is an assumed value for the first motion vector, $d_2$ is an assumed value for the second motion vector, wherein $(d_1, d_2)$ describes an assumed motion vector, c is a normalization constant, $W_{F1}(i,j)$ describes a luminance value of the image to be coded at a location $(i,j)$, $W_{F2}(i,j)$ describes a luminance value of the chronologically preceding images at the location $(i,j)$, and wherein a picture element size of the region in the first direction is $2T+1$, a picture element size of the region in the second direction is $2\lambda+1$, and N is the number of picture elements located in the region, with $N = (2T+2\lambda-1)\cdot 3$.

5. A method as claimed in claim 4, comprising including at least one of the following, additional summands in said cost function:

$$f(x_1) = \mu\sqrt{|x_1|} + \varepsilon|x_1|, \qquad x_1 \geq 0,$$

and $$f(x_2) = \mu\sqrt{|x_2|} + \varepsilon|x_2|, \qquad x_2 \geq 0,$$

wherein $x_1$, $x_2$ respectively represent a differential quantity of the motion vector value $d_1$ for the first direction and a differential quantity of the motion vector $d_2$ for the second direction for two neighboring picture elements along of the scan line S, $\mu, \epsilon$ are two empirically determined constants.

6. A method as claimed in claim 4, comprising including at least one of the following, additional summands in said cost function:

$$f(x_1, s) = \frac{(\mu\sqrt{|x_1|} + \varepsilon|x_1|)}{e^{\beta s^\theta}}, \qquad x_1 \geq 0, s \geq 0,$$

and $$f(x_2, s) = \frac{(\mu\sqrt{|x_2|} + \varepsilon|x_2|)}{e^{\beta s^\theta}}, \qquad x_2 \geq 0, s \geq 0,$$

wherein $x_1, x_2$ respectively represent a differential quantity of the motion vector value $d_1$ for the first direction and a differential quantity of the motion vector $d_2$ for the second direction for two neighboring picture elements along the scan line S, $\mu, \epsilon$ are two empirically determined constants, $\beta$ is a gradient intensification constant, and s is a normalized luminance gradient for the respective picture element.

7. A method as claimed in claim 6, comprising using a Sobel filter for forming said normalized luminance gradient.

* * * * *